United States Patent
Poilve (10) Patent No.: US 10,810,704 B2
(45) Date of Patent: Oct. 20, 2020

(54) METHOD FOR PROCESSING AN OPTICAL IMAGE ACQUIRED IN THE PRESENCE OF AEROSOLS AND/OR CLOUDS IN THE ATMOSPHERE

(71) Applicant: AIRBUS DS GEO SA, Toulouse (FR)

(72) Inventor: Herve Poilve, Pechabou (FR)

(73) Assignee: AIRBUS DS GEO SA, Toulouse (FR)

( * ) Notice: Subject to any disclaimer, the term of this patent is extended or adjusted under 35 U.S.C. 154(b) by 0 days.

(21) Appl. No.: 16/608,130

(22) PCT Filed: May 9, 2018

(86) PCT No.: PCT/EP2018/061950
§ 371 (c)(1),
(2) Date: Oct. 24, 2019

(87) PCT Pub. No.: WO2018/210647
PCT Pub. Date: Nov. 22, 2018

(65) Prior Publication Data
US 2020/0167898 A1 May 28, 2020

(30) Foreign Application Priority Data

May 15, 2017 (FR) ..................................... 17 54234

(51) Int. Cl.
 *G06T 5/00* (2006.01)
 *G06K 9/00* (2006.01)
 *G06T 5/20* (2006.01)
(52) U.S. Cl.
 CPC ............ *G06T 5/001* (2013.01); *G06K 9/0063* (2013.01); *G06T 5/20* (2013.01); *G06T 2207/10032* (2013.01); *G06T 2207/30192* (2013.01)

(58) Field of Classification Search
CPC combination set(s) only.
See application file for complete search history.

(56) References Cited

U.S. PATENT DOCUMENTS 8,509,476 B2 * 8/2013 Amin ................... G06K 9/0063
  382/100
8,594,375 B1 * 11/2013 Padwick .............. G06K 9/0063
  382/103

(Continued)

FOREIGN PATENT DOCUMENTS

WO 2014197021 A2 12/2014

OTHER PUBLICATIONS

Lyaputsin, Alexei I "Multi-angle implementation of atmospheric correction of MODIS (MAIC): 3. Atmospheric Correction" Remote Sensing of Environment (2012). (Year: 2012).*

(Continued)

*Primary Examiner* — Kim Y Vu
*Assistant Examiner* — Molly Delaney
(74) *Attorney, Agent, or Firm* — Notaro, Michalos & Zaccaria P.C.

(57) ABSTRACT

A method for processing an optical image acquired by a space vehicle or an aerial vehicle having a ground reflectance model and an atmospheric model, the atmospheric model having an aerosol model and a cloud model; determining optimal values of atmospheric model parameters to optimise the atmospheric model with respect to the image; determining correction parameter values for each layer of the atmospheric model, converting the image into a ground image with environmental effects according to the correction parameter values, converting the ground image with environmental effects into a ground image with no environmental effects according to the correction parameter values.

15 Claims, 4 Drawing Sheets

(56) References Cited

U.S. PATENT DOCUMENTS

2017/0294011 A1* 10/2017 Chen .................. G06K 9/6212
2020/0034949 A1* 1/2020 van Niekerk ......... G06T 3/4038

OTHER PUBLICATIONS

He, Kaiming, et al., "Single Image Haze Removal Using Dark Channel Prior", CVPR 2009, http://kaiminghe.com/publications/cvpr09.pdf, retrieved Oct. 24, 2019, pp. 1-8.
Jacquemond, Stephanie, et al., "PROSPECT + SAIL models: A review of use for vegetation characterization", Elsevier, Remote Sensing of Environment 113, 2009 Elsevier Inc., S56-S66.
Babin, Marcel, et al., "Variations in the light absorption coefficients of phytoplankton, nonalgal particles, and dissolved organic matter in coastal waters around Europe", Journal of Geophysical Research, vol. 08, No. C7, 3211, 2003, pp. 4-1-4-20.
Kneizys, F.X., et al., "Users Guide to LOWTRAN 7", Environmental Research Papers, No. 1010, Air Force Geophysics Laboratory, Optical/Infrared Technology Division, Project 7670, Aug. 16, 1988, Hanscom AFB, MA.
Hassan Ouai Drari et al, "Operational Atmospheric Correction of Landsat TM Data", Remote Sensing of Environment, vol. 70, No. 1, Oct. 1, 1999 (Oct. 1, 1999), pp. 4-15.
R. Richter, "Correction of atmospheric and topographic effects for high spatial resolution satellite imagery", International Journal of Remote Sensing, vol. 18, No. 5, Mar. 1, 1997 (Mar. 1, 1997), pp. 1099-1111.
International Search Report for corresponding PCT application No. PCT/EP2018/061950, dated Jul. 26, 2018.
Written Opinion of the International Searching Authority and International Search Report for corresponding PCT application No. PCT/EP2018/061950, dated Jul. 26, 2018.

* cited by examiner

METHOD FOR PROCESSING AN OPTICAL IMAGE ACQUIRED IN THE PRESENCE OF AEROSOLS AND/OR CLOUDS IN THE ATMOSPHERE

TECHNICAL FIELD

The present invention belongs to the field of optical images acquired by an optical observation instrument on board a space vehicle, such as a satellite, or an aerial vehicle moving at high altitude, and relates more particularly to a method for processing an image in order to correct the effects linked to the presence of aerosols and/or clouds, during the acquisition of said image, in the atmosphere between the space or aerial vehicle and the scene observed represented by said image.

PRIOR ART

Indeed, it is known that the presence of aerosols (fog, sand, etc.) or of clouds that are not very thick above a scene observed from a satellite results, in images that measure the radiation received from the scene in bands of wavelengths in particular optical, by the presence of a whiteout that modifies the perception of said scene. The presence of aerosols or of clouds also results in an effect referred to as the environmental effect (adjacency effect) which results in a blurred image due to the scattering of the radiation on the particles present in the atmosphere.

It is therefore desirable to be able to process such images in order to try to suppress all or a portion of said whiteout and environmental effect.

It goes without saying that this is very particularly interesting in the regions of the Earth that suffer from difficult atmospheric conditions, such as for example tropical regions that, when they are not entirely covered by clouds during the rainy season, are frequently affected by mists during the dry season. This type of processing can be applied more generally in any region of the Earth, in particular when it entails producing mosaic images of areas of large dimensions from several images, in order to make use of images of lesser quality and thus accelerate the finalization of the mosaic image.

Such processing aiming to suppress the effects linked to the presence of aerosols and/or of clouds are used not only to improve the visual rendering of an image, but also to provide a more robust and standardized representation that makes it possible in fine to improve the effectiveness of any later processing, such as for example a classification of the scene, etc.

Furthermore, it is desirable to be able to carry out this processing autonomously, i.e. without needed external information on the atmospheric conditions wherein an image has been acquired and without having to call upon another image that represents the same scene.

In order to correct the effects of the atmosphere on an image acquired by a satellite, it is known in particular to search for the darkest pixels of the image, and to suppose that these pixels represent dark objects in the scene (so called "dark prior" approach). These pixels are then used to characterize the whiteout present in the image and suppress it. Such an approach is for example described in the scientific article: "Single Image Haze Removal Using Dark Channel Prior", Kaiming He, Jian Sun, Xiaoou Tang, CVPR 2009.

However, the automatic detection of dark pixels is sometimes complicated and, above all, such pixels do not always exist on an image. An alternative consists in using reference objects in the scene, of which the reflectance is a priori known, and to use them to characterize the whiteout present in the image. However, it is not always possible to have such reference objects in a scene, and the detection thereof can furthermore be rendered difficult by the presence of aerosols and/or of clouds in the atmosphere.

It is also known from international application WO 2014/197021 to combine the preceding approach with an atmospheric model that models the propagation in the atmosphere in the presence of aerosols. The atmospheric model used is of the LOWTRAN type. The method described automatically searches for the dark pixels in the image and iteratively estimates the aerosol optical depth (AOD). By supposing that the dark pixels correspond to dark objects, the method estimates the aerosol optical depth by taking account of the environmental effect.

However, the hypothesis of the presence of a dark object is not always verified, in such a way that the processing applied is not always effective. Furthermore, the method described does not make it possible to distinguish the aerosols from the clouds, although the latter produce different effects. On the one hand, the effects of the aerosols are highly marked in the blue wavelengths while the effects of the clouds are relatively achromatic. Furthermore, aerosols and clouds produce different environmental effects due to the fact that they are located at different altitudes and have different scattering behaviors.

DISCLOSURE OF THE INVENTION

The present invention has for objective to overcome all or a portion of the limitations of the solutions of prior art, in particular those disclosed hereinabove, by proposing a solution that makes it possible to suppress all or a portion of the effects linked to the presence of aerosols and/or of clouds (non-opaque) in an image acquired by an optical observation instrument on board a space vehicle, such as a satellite, or an aerial vehicle moving at high altitude.

Furthermore, the present invention aims to propose a solution that makes it possible to carry out such processing autonomously, i.e. without having to receive information a priori on the atmospheric conditions in which the image was acquired and without having to call upon another image that represents the same scene acquired on a prior date.

To this effect, and according to a first aspect, the invention relates to a method for processing an optical image acquired by a space vehicle or an aerial vehicle, said image representing a radiation in at least one band of wavelengths received from a scene on the surface of the Earth, comprising:

obtaining a reflectance model of the scene and an atmospheric model, said atmospheric model comprising at least one aerosol model and a cloud model modeling the effects of the atmosphere in respective layers of different respective altitudes, determining optimal values of the parameters of the atmospheric model making it possible to optimize said atmospheric model with respect to the image, determining correction parameter values for each layer of the atmospheric model according to the optimal values of the atmospheric model, converting of the image into a ground image with environmental effects according to the correction parameter values of each layer of the atmospheric model, converting of the ground image with environmental effects into a ground image with no environmental effects according to the correction parameter values of each layer of the atmospheric model.

Thus, the method of image processing uses a ground reflectance model that models the intrinsic reflectance of the scene observed, and does not require detecting dark pixels in the image and supposing that the latter represent dark objects of the scene.

Furthermore, the method of image processing uses an atmospheric model which is a multilayer model comprising at least two layers of different respective altitudes, namely a layer modeled by an aerosol model that restores the effects of aerosols and, above, a layer modeled by a cloud model that restores the effects of the clouds.

Consequently, the effects of the aerosols on the one hand and the effects of the clouds on the other hand are modeled by two different models, taking account of the respective altitudes at which the aerosols are found (for example between 0 and about 2 kilometers) and the clouds are found (for example between about 2 kilometers and about 4 kilometers) in the atmosphere. This results in that the respective effects of the aerosols and of the clouds can be estimated better and corrected in the image acquired by the space or aerial vehicle.

The method of processing then comprises a conversion of the image into a ground image with environmental effects, i.e. into a ground image wherein the environmental effects have not yet been corrected, and a conversion of said ground image with environmental effects into a ground image with no environmental effects, i.e. into a ground image wherein the environmental effects have been corrected.

In particular embodiments, the method of image processing can furthermore comprise one or several of the following characteristics, taken individually or according to any technical permissible combination.

In particular embodiments, the correction parameters comprise intrinsic reflectances and intrinsic attenuations of each layer of the atmospheric model, and the converting into a ground image with environmental effects comprises a correction of these intrinsic reflectances and intrinsic attenuations of the various layers of the atmospheric model.

In particular embodiments, the correction parameters comprise environmental proportions transmitted for each layer of the atmospheric model, and the converting into a ground image with no environmental effects comprises a correction of the environmental contributions introduced by the various layers according to the background proportions transmitted.

In particular embodiments, the correcting of an environmental contribution into one pixel for a layer comprises:
- calculating a reflectance received in a view cone of which the apex corresponds to the pixel considered,
- suppressing of said reflectance received in the view cone, weighted by the proportion of environmental effect transmitted for the layer considered and the pixel considered.

In particular embodiments, the method for image processing comprising an identification of pixels of the image for which a criterion of opacity of the cloud model is verified, referred to as "masked pixels", and the value of each masked pixel is forced, in the ground image with no environmental effects, to a predetermined value.

Indeed, in case of an opaque cloud, it is not possible to restore the scene under the cloud, in such a way that it is not necessary to correct the values of the pixels that represent the scene masked under the cloud.

In particular embodiments, the predetermined value corresponds to the value of the masked pixel in the image after conversion into top-of-cloud values or into top-of-the-atmosphere value.

In particular embodiments, the determining of optimal values of parameters of the atmospheric model comprises a determining, for each parameter, a map of optimal values of said parameter associated respectively with different pixels of the image, and a spatial filtering of said map of optimal values of said parameter.

In particular embodiments, for each parameter, the determining of a map of optimal values of said parameter further comprises a determining of a map of confidence values associated with the optimal values, and the spatial filtering of a map of optimal values is carried out according to the associated map of confidence values.

In particular embodiments, the spatial filtering of a map of optimal values comprises a calculation of maps of optimal values at a degraded resolution for different values of resolution degradation, according to the map of optimal values and the associated map of confidence values, and a calculation of a weighted average of the map of optimal values and of the maps of optimal values with a degraded resolution.

In particular embodiments, the image corresponds to a raw image of which the values of the pixels have been converted into top-of-the-atmosphere values.

In particular embodiments, the image corresponds to a high-resolution image of which the resolution has been degraded, comprising a determining of the correction factors to be applied to the image in order to obtain the ground image with no environmental effects, and a converting of the high-resolution image into a high-resolution ground image with no environmental effects according to said correction factors.

In particular embodiments, the atmospheric model further comprises a sky model modeling the effects of the atmosphere in a layer of altitude greater than the layer of the cloud model.

In particular embodiments, the method of processing comprises a prior step of determining if the image comprises a cloud, with an atmospheric model without a cloud model being used when it is determined that the image does not contain a cloud.

In particular embodiments, during the converting into a ground image with environmental effects, the respective effects of each layer of the atmospheric model are corrected successively, by considering said layers successively by decreasing altitudes.

In particular embodiments, during the converting into a ground image with no environmental effects, the respective effects of each layer of the atmospheric model are corrected successively, by considering said layers successively by decreasing altitudes.

According to a second aspect, the invention relates to a computer program product comprising a set of program code instructions that, when they are executed by a processor, configure said processor to implement a method for processing an image according to any of the embodiments of the invention.

According to a third aspect, the invention relates to a device for processing an image acquired by a space vehicle or an aerial vehicle comprising means configured to implement a method for processing an image according to any of the embodiments of the invention.

PRESENTATION OF THE FIGURES

The invention shall be better understood when reading the following description, given by way of an example that is in no way limiting, and given in reference to the figures which show.

In these figures, identical references from one figure to another designate identical or similar elements. For reasons of clarity, the elements shown are not to scale, unless mentioned otherwise.

DETAILED DESCRIPTION OF EMBODIMENTS

In the rest of the description, it is considered in a non-limiting manner the case of a processing of images acquired from a space vehicle of the satellite type. It is suitable however to specify that the invention also applies to images acquired by an optical observation instrument on board an aerial vehicle (aircraft, balloon, drone, etc.) moving at an altitude that is high enough so that said image is exposed to the whiteout and environment effects of the underlying atmospheric column.

Figure 1:
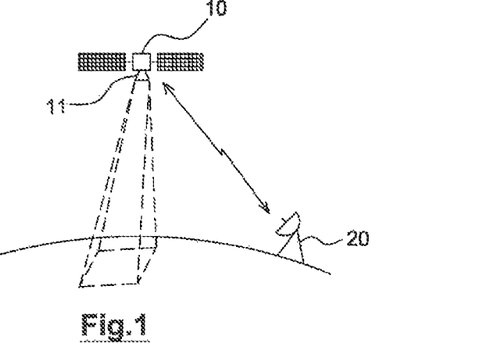
FIG. 1: diagrammatically shows an observation satellite in terrestrial orbit.

FIG. 1 diagrammatically shows a satellite 10 in terrestrial orbit, configured to observe a scene on the surface of the Earth. The terrestrial orbit is for example a moving orbit, in such a way that the scene observed by the satellite varies over time, due at least to the displacement of said satellite 10 with respect to the Earth.

Conventionally, the satellite 10 carried at least one optical observation instrument 11 that makes it possible to acquire an image corresponding to the radiation received in a band of wavelengths. The band of wavelengths for image acquisition is in the range of the optical wavelengths that correspond to the range of visible and infrared wavelengths, in particular near infrared (NIR) or short wavelength infrared (SWIR).

Generally, the observation instrument or instruments 11 carried by the satellite 10 comprise a set of sensitive detectors in bands of different respective wavelengths. The acquired image of a scene is then multi-spectral or hyper-spectral (if the number of bands of wavelengths is substantial) and then comprises several basic images of the scene acquired in bands of different respective wavelengths. For example, it is possible to have at the same time:

a basic image in the band of the blue wavelengths (for example [450-520] nanometers), a basic image in the band of the green wavelengths (for example [530-590] nanometers), a basic image in the band of the red wavelengths (for example [625-695] nanometers).

a basic image in the band of the near infrared wavelengths (for example [760-890] nanometers).

The observation instrument 11 can also, according to other examples, be a panchromatic instrument and directly acquire an image in a wide band of wavelengths, which directly covers for example all of the visible wavelengths.

The present invention can be applied to an image in the broad sense, i.e. it can be applied on a single image (basic) acquired in a single band of wide or narrow wavelengths. However, the present invention has a particularly advantageous application in the case of an image which is multi-spectral or hyper-spectral, i.e. in the case of an image of a scene that is formed from a plurality of basic images of the scene acquired in bands of different respective wavelengths.

Once an image is acquired by the observation instrument or instruments 11 of the satellite 10, said image is memorized in order to be transmitted to a ground station 20, when the satellite 10 flies over said ground station 20. Once transmitted to a ground station 20, the image is then supplied to a device for processing (not shown in the figures) which can carry out in deferred time the processing that aims to correct in the image the effects of the presence of aerosols and/or of clouds in the atmosphere during the acquisition of the image, by implementing a method 50 for processing the image.

The device for processing comprises for example a circuit for processing comprising one or several processors and means for memorizing (magnetic hard drive, electronic memory, optical disk, etc.) wherein are memorized data and a computer program product, in the form of a set of program code instructions to be executed to implement all or a portion of the steps of the method 50 of processing the image. Alternatively or as a supplement, the processing circuit comprises one or several programmable logic circuits (FPGA, PLD, etc.), and/or one or several specialized integrated circuits (ASIC), and/or a set of discrete electronic components, etc. suitable for implementing all or a portion of the steps of the method 50 of processing the image.

In other terms, the circuit for processing corresponds to a set of means configured by software (specific computer program product) and/or by hardware (FPGA, PLD, ASIC, etc.) in order to implement the various steps of the method 50 for processing the image.

Figure 2:
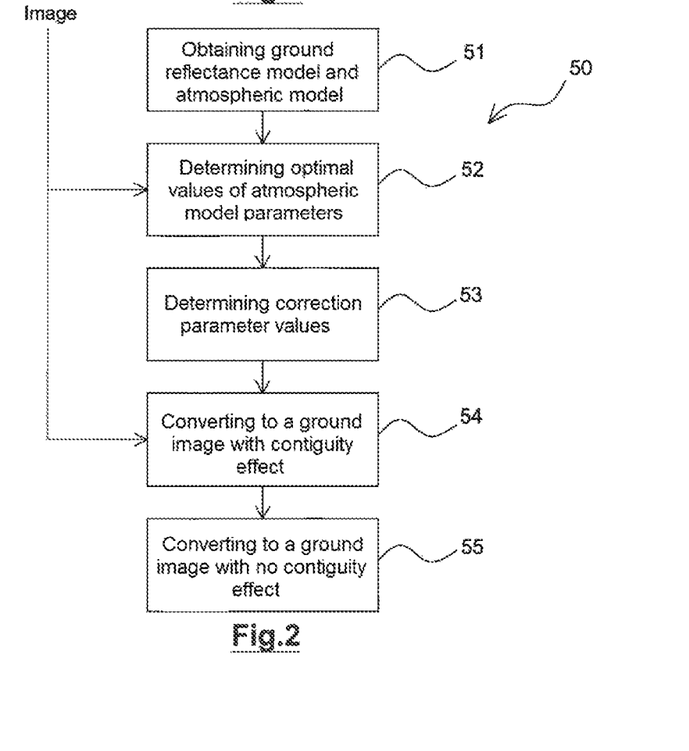
FIG. 2: a diagram showing the main steps of a method for processing an image.

FIG. 2 diagrammatically shows the main steps of a method 50 for processing the image aiming to correct the effects of the presence of aerosols and/or of clouds in the acquired image of a scene. Such as shown in FIG. 2, the method 50 of processing the image comprises steps of:

51 obtaining of a ground reflectance model and of an atmospheric model modeling the effects of the atmosphere between the scene and the satellite 10, said atmospheric model comprising at least one aerosol model and a cloud model modeling the effects of the atmosphere in respective layers of different respective altitudes,

52 determining optimal values of the parameters of the atmospheric model making it possible to optimize said atmospheric model with respect to the image,

53 determining correction parameter values for each layer of the atmospheric model according to the optimal values of the atmospheric model,

54 converting the image into a ground image with environmental effects according to the correction parameter values of each layer of the atmospheric model,

55 converting the ground image with environmental effects into a ground image with no environmental effects according to the correction parameter values of each layer of the atmospheric model.

Examples of implementation of the steps hereinabove are described in more detail hereinafter, in reference in particular to FIG. 3 that shows a preferred embodiment of the method 50 for processing the image.

Figure 3:
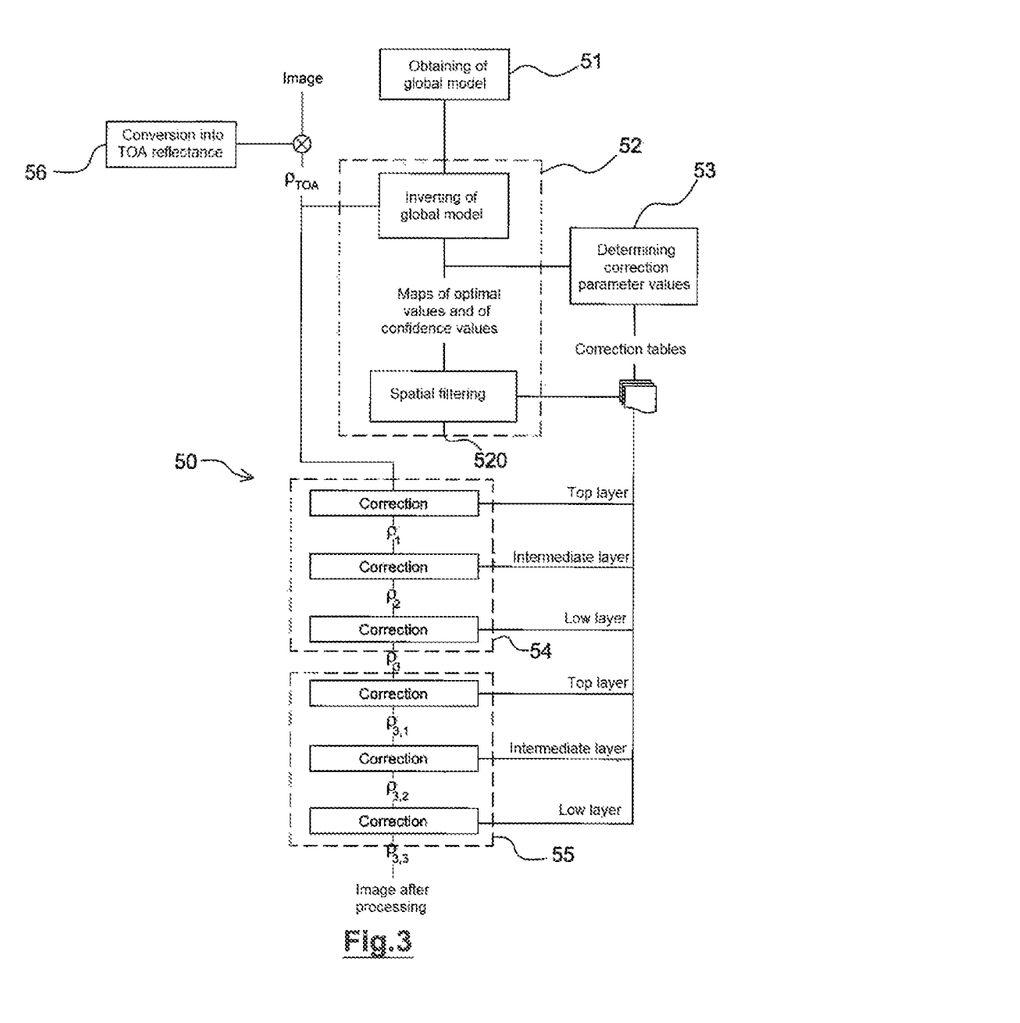
FIG. 3: a diagram showing a preferred embodiment of the method for processing an image.

In the non-limiting example shown in FIG. 3, the method 50 of processing the image further comprises a step 56 of converting values of pixels of the image into top-of-the-atmosphere values. Such a conversion aims therefore to obtain an image of a physical value of reflectance such that it can be measured in space outside the atmospheric envelope of the Earth.

A) Obtaining a Ground Reflectance Model and Atmospheric Model

Such as indicated hereinabove, the method 50 for processing an image uses a scene model which mainly comprises two types of models:
- a ground reflectance model that models the intrinsic reflectance of the scene observed according to different parameters, and
- an atmospheric model that models the atmosphere transfer function between the scene and the satellite 10, and more particularly between the scene and the top of the atmosphere, according to different parameters.

A.1) Ground Reflectance Model

The ground reflectance model is for example based on a SAIL/PROSPECT model, that models in particular the reflectance of scenes corresponding to vegetation coverage, with vegetation being the main contributor in most of the scenes observed from a satellite 10.

The SAIL/PROSPECT model, also known under the name of PROSAIL model in scientific literature, takes into account, conventionally, the direction of illumination of the scene by the Sun as well as the viewing direction of the instrument (BRDF model for "Bidirectional Reflectance Distribution Function").

The SAIL/PROSPECT model has been validated in an exhaustive manner and is commonly used by the scientific community. Mention can be made by way of example of the scientific publication: "PROSPECT+SAIL Models: A Review of Use for Vegetation Characterization", Jacquemoud S., Verhoef W., Baret W., Bacour C., Zarco-Tejada P. J., Asner G. P., Francois C., Ustin, S. L., Remote Sensing of Environment 113, S56-S66.

It is also possible to enrich the ground reflectance model by means for example:
- of a priori knowledge of the coverage observed and of a predetermined range of vegetation density (ranging for example from tropical forest to a semi-arid region),
- of a water component, which for example implements a radiative transfer model using the same formalism as the model SAIL and the optical properties of the water such as characterized in potentially shallow and turbid water, referred to as the CASE II type (see for example "Variations in the Light Absorption Coefficients of Phytoplankton, Nonalgal Particles, and Dissolved Organic Matter in Coastal Waters Around Europe", Babin et al., Journal of Geophysical Research, 108, 3211) if it is known a priori that a strong presence of water is possible in the scene observed (for example a coastal zone, lakes, etc.),
- of a predetermined special ground response, selected according to a priori knowledge of the type of ground observed in the scene when the contribution of the ground is able to be substantial with respect to the contribution of plant coverage (mountain, desert, etc.), of a modeling of other characteristics that can influence the reflectance of the scene observed, such as for example a substantial presence of burned zones, snow zones, artificial surfaces that have a predetermined spectral signature, etc.

A.2) Atmospheric Model

The atmospheric model is for example based on a LOWTRAN model (see for example "Users Guide to LOWTRAN 7", Kneisys F. X. et al., 1988, Air Force Geophysics Lab Hanscom AFB MA).

Such as indicated hereinabove, the atmospheric model is a multilayer model that comprises at least two layers of different respective altitudes, namely a layer modeled by an aerosol model that models the aerosol effects and, above, a layer modeled by a cloud model that models the effects of clouds.

In the rest of the description, we shall examine in a non-limiting manner the case where the atmospheric model further comprises a sky model modeling the effects of the atmosphere in a layer of altitude greater than the layer of the cloud model.

Figure 4:
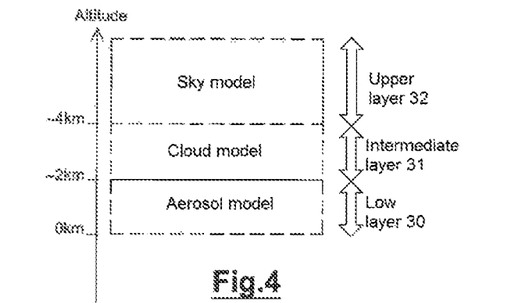
FIG. 4: diagrammatically shows the different layers of an example of an atmospheric model.

The distribution of the various layers of the atmospheric model is shown in FIG. 4. Such as shown in FIG. 4, the atmosphere is modeled according to three main layers:
- a low layer 30, which corresponds for example to the altitudes between 0 and about 2 kilometers in which the aerosols are located, and which is modeled by the aerosol model,
- an intermediate layer 31, which corresponds for example to the altitudes between about 2 and about 4 kilometers at which clouds can be located (except for certain types of clouds, such as for example cirrus clouds), and which is modeled by the cloud model,
- a top layer 32, above the intermediate layer 31 and up to the top of the atmosphere, which mainly introduces a Rayleigh scattering modeled by the sky model.

The aerosol model and the cloud model are for example modeled as turbid medium layers with a Henvey-Greenstein phase function and a skewness parameter adapted to the respective behaviors of the aerosols and of the clouds. For the aerosol model and the cloud model, the transfer functions are for example expressed according to the formalism 4-flux such as developed in the model SAIL.

The optical properties of clouds are well known and described in literature, and can be used to configure the cloud model, and to establish a relationship between the optical thickness of a cloud and the apparent reflectance of said cloud, for example in order to use the optical cloud thickness as a parameter of the cloud model.

For an aerosol model of the LOWTRAN type, the guiding parameter is generally the visibility distance, in relation with the charge of aerosols. The optical properties of the aerosols can be deduced from the call of the LOWTRAN model, via a comparison of the results supplied by said LOWTRAN model by considering on the one hand an absence of aerosols (maximum visibility) and, on the other hand, a particular type of aerosols and a reference value of the visibility distance. Thus, it is possible to establish relations ("look-up tables") between the visibility distance parameter of the LOWTRAN model and the optical depth of the aerosol layer, and to use said visibility distance as a parameter of said aerosol model.

It is also possible to enrich the aerosol model and/or the cloud model be means for example of a sand model for the geographical zones wherein particles of sand in a non-negligible quantity can be found in the low layer 30 and/or in the intermediate layer 31.

The sky model models, conventionally, the Rayleigh scattering introduced by the top layer 32. The intensity of the Rayleigh scattering, in relation with the optical thickness of the molecular atmospheric column, can be controlled conventionally by an equivalent altitude parameter. This parameter depends on the relief of the scene, varies moderately according to the conditions of pressure and temperature, and corresponds above opaque clouds to the apparent altitude of the cloud ceiling. This parameter is designated hereinafter by "deck altitude of the atmospheric column".

A.3) Selection of the Scene Model

In order to be able to process images of scenes located at different places on the surface of the Earth, it is possible, in particular embodiments, to memorize in a database a library of scene models. Each scene model memorized in this database corresponds to a particular combination of a ground reflectance model and of an atmospheric model adapted to a particular combination of the landscape type and of climate conditions.

By classifying different zones on the surface of the Earth according to their types of landscape and their climate conditions, it is possible to establish one or several geographical maps that make it possible to select, for each zone on the surface of the Earth, the scene model that is most suited to the type of landscape and climate conditions encountered in this zone.

Thus, the selection reverts mainly, in the case where a global library of scene models has been compiled beforehand in a database, in identifying the zone wherein the scene observed is located and in obtaining in the database the scene model associated with said zone.

B) Determining Optimal Values of Parameters of the Scene Model

Such as indicated hereinabove, the method 50 for processing the image comprises a step 52 of determining optimal values of parameters of the atmospheric model making it possible to optimize said atmospheric model with respect to the image.

Said step 52 of determining optimal values of parameters of the atmospheric model is part of a more general process of inverting the scene model which leads to also determining optimal values of the parameters of the ground reflectance model making it possible to optimize the ground reflectance model with respect to the image. In other terms, the step 52 aims to determine optimal values of the parameters of the ground reflectance model and of the optimal values of the respective parameters of the different layers of the atmospheric model, making it possible to optimize the scene model with respect to the image. More preferably, the ground reflectance model and the atmospheric model of the scene model are optimized jointly and simultaneously.

Indeed, a particular set of values of the parameters of the scene model makes it possible to obtain a theoretical image of said scene at the top of the atmosphere, which can be compared to the image acquired by the satellite 10.

For example, the optimization aims to maximize the resemblance between the theoretical image and the image acquired by the satellite 10, i.e. it aims to determine the so-called optimal values of said parameters that make it possible to obtain a maximum resemblance between the theoretical image and said image acquired by the satellite 10. However, other types of optimization can be considered and a process of optimization generally comprises the defining beforehand of a cost function to be optimized, i.e. to be minimized or maximized according to the type of cost function. The choice of a particular cost function forms only an alternative implementation of the invention.

For example, the parameters for which the optimal values must be determined of the atmospheric model correspond to:
- the visibility distance for the aerosol model,
- the optical cloud thickness for the cloud model, and
- the deck altitude of the atmospheric column for the sky model.

However, the invention can also be applied by considering other types of parameters, and the choice of a particular type of parameter forms only an alternative implementation of the invention. By way of example, it is also possible to consider as a parameter of the aerosol model the aerosol optical depth (AOD).

Note that the higher the number of measurements in the spectral range is, the more accurate the determined optimal values of said parameters will be and the closer they will be to reality. As such, the use of a multi-spectral or hyper-spectral image, formed from several basic images representing the radiation received from the same scene in difference respective bands of wavelengths makes it possible to increase the number of measurements and therefore improve the performance of the inverting of the atmospheric model (and, more generally, of the scene model).

At the end of the step 52 of determining optimal values of the scene model, we therefore have for example, at each pixel of the image (and, in the case of a multi-spectral or hyper-spectral image, for each basic image):
- an optimal value for the visibility distance,
- an optimal value for the optical cloud thickness,
- an optimal value for the deck altitude of the atmospheric column.

Furthermore, the known methods of optimization also make it possible to provide a confidence value associated with each determined optimal value of a parameter, representative of the likelihood of said optimal value in light for example of the respective values of the corresponding pixel in the theoretical image and in the image acquired by the satellite 10. Thus, at the end of the step 52 of determining optimal values of the scene model, it also possible to have, at each pixel of the image (and, in the case of a multi-spectral or hyper-spectral image, for each basic image):
- a confidence value associated with the optimal value of the visibility distance,
- a confidence value associated with the optimal value of the optical cloud thickness,
- a confidence value associated with the deck altitude of the atmospheric column.

Note that, for the top layer 32, the optimal value of the low altitude of the atmospheric column is in principle substantially the same for all of the pixels of the image. Consequently, it is possible, for the sky model of the top layer 32, to determine only a single optimal value of the deck altitude of the atmospheric column, or to determine only a few optimal values for a few pixels of said image (and, optionally, the associated confidence values).

It is also to be noted that, similarly, optimal values (and optionally associated confidence values) can be obtained for the parameters of the ground reflectance model.

In particular embodiments, the confidence values associated with the optimal values of the parameters of the atmospheric model, calculated during the inverting of the scene model, can be weighted so as to take account of different criteria.

According to a first example, it is possible to take account of the optimal value of the optical cloud thickness in order to weight the confidence value of the optimal value of the visibility distance of the low layer 30 of the same pixel. Indeed, in the case of a thick cloud, the charge of aerosols under the cloud cannot be determined correctly. It is therefore advantageous, in the case where the optimal value of the optical cloud thickness is substantial, to reduce the confidence value of the optimal value of the visibility distance of the low layer 30 determined for the same pixel.

According to another example, it is possible to take account of optimal values of parameters of the ground reflectance model in order to weight the confidence values of the optimal values of the visibility distance of the low layer 30. Indeed, the determining of the charge of aerosols (and therefore of the visibility distance) is more accurate above the dark zones such as forests. It is therefore advantageous to increase the confidence value of the optimal value of the visibility distance of the low layer 30 for a pixel that represents a zone of dense and dark vegetation of the scene.

At the end of the step 52 of determining optimal values of the scene model, we therefore more preferably have, for each parameter and for each layer of the atmospheric model (and, where applicable, for each basic image):
  a map of optimal values associated respectively with different pixels,
  a map of confidence values associated with said optimal values.

Such as indicated hereinabove, for the top layer 32, the optimal value of the deck altitude of the atmospheric column is in principle substantially the same for all of the pixels of the image. Consequently, it is possible to determine maps of optimal values and of associated maps of confidence values only for the low layer 30 (aerosol model) and for the intermediate layer 31 (cloud model).

In preferred embodiments, and such as shown in FIG. 3, the method 50 for processing an image further comprises a step 520 of spatial filtering of the maps of optimal values of parameters. Advantageously, the spatial filtering of a map of optimal values is carried out according to the associated map of confidence values.

Figure 5:
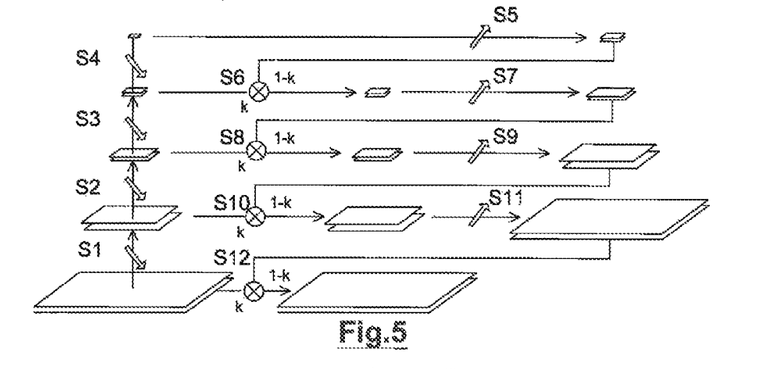
FIG. 5: a diagram showing the pyramidal operation of a spatial filtering of a map of optimal values of a parameter of the atmospheric model.

FIG. 5 diagrammatically shows a preferred embodiment, wherein the step 520 of spatial filtering of a map of optimal values comprises a calculation of maps of optimal values at a degraded resolution for different values of resolution degradation, according to the map of optimal values and the associated map of confidence values, and a calculation of a weighted average of the map of optimal values and of the maps of optimal values with a degraded resolution.

Indeed, in the non-limiting example shown in FIG. 5, various maps of optimal values (and of associated maps of confidence values) at a degraded resolution are calculated.

More particularly, the example shown in FIG. 5 shows four successive degradations in resolution by a factor 2 (steps S1, S2, S3 and S4 in FIG. 5), in such a way as to obtain maps of optimal values (and of associated maps of confidence values) at a degraded resolution by respectively a factor 2, 4, 8 and 16. It is to be noted that it is possible to consider a number of successive degradations of resolution by a factor 2 different from four, and the example shown in FIG. 5 is not limited to a particular number of successive resolution degradations. For example, it is possible to carry out successive resolution degradations by a factor 2 until obtaining a map of optimal values at a degraded resolution that comprises only a single pixel along a dimension.

Each resolution degradation is more preferably carried out by means of fast convolution filters that calculate a weighted average of the optimal values according to the confidence values associated with successive spatial sub-resolutions that correspond to a degradation in the initial resolution by factors 2 to 16.

The map of optimal values (and the associated map of confidence values) obtained at the end of the step S4 is then subjected to an increase in resolution by a factor 2 (step S5). A weighted average of the map of optimal values obtained at the end of the step S3 and of the map of optimal values obtained at the end of the step S5 is then calculated (step S6), by means of respective weighting coefficients k and (1-k), k being for example chosen equal to 0.5. The associated maps of confidence values are combined according to the same weighted average.

The map of optimal values (and the associated map of confidence values) obtained at the end of the step S6 is then subjected to an increase in resolution by a factor 2 (step S7). A weighted average of the map of optimal values obtained at the end of the step S2 and of the map of optimal values obtained at the end of the step S7 is then calculated (step S8), by means of said weighting coefficients k and (1-k). The associated maps of confidence values are combined according to the same weighted average.

The map of optimal values (and the associated map of confidence values) obtained at the end of the step S8 is then subjected to an increase in resolution by a factor 2 (step S9). A weighted average of the map of optimal values obtained at the end of the step S1 and of the map of optimal values obtained at the end of the step S9 is then calculated (step S10), by means of said weighting coefficients k and (1-k). The associated maps of confidence values are combined according to the same weighted average.

The map of optimal values (and the associated map of confidence values) obtained at the end of the step S10 is then subjected to an increase in resolution by a factor 2 (step S11). A weighted average of the initial map of optimal values and of the map of optimal values obtained at the end of the step S11 is then calculated (step S12), by means of said weighting coefficients k and (1-k). The associated maps of confidence values are combined according to the same weighted average.

The map of optimal values and the associated map of confidence values obtained at the end of the step S12 correspond to the result of the spatial filtering in the example shown in FIG. 5.

In preferred embodiments, the spatial filtering of the map of optimal values of the optical cloud thickness does not concern the pixels for which a predetermined criterion of opacity is verified. For example, the criterion of opacity is verified if the optimal value of the optical cloud thickness is greater than a predetermined threshold value that represents the presence of an opaque cloud.

Indeed, the spatial filtering, which is a low-pass filter, tends to soften the rapid transitions of the map of optimal values and therefore makes it possible to suppress artifacts linked for example to noise. However, such a spatial filtering would also contribute to softening a delimitation of a thick cloud, which would contribute to spreading this delimitation on neighboring pixels of the thick cloud. That is why it is advantageous to no carry out spatial filtering on the optimal values corresponding to a thick cloud. For example, it is possible to identify the pixels, referred to as "masked pixels", for which the criterion of opacity is verified. For these masked pixels, the initial map of confidence values is for example modified in order to force the confidence values associated with the masked pixels to zero. The map of confidence values thus modified is used during the step 520 of spatial filtering. At the end of the step 520 of spatial filtering, the optimal values of the masked pixels and the associated confidence values are for example replaced with their initial values, before spatial filtering.

C) Determining Correction Parameters for Each Layer

Such as indicated hereinabove, the method 50 for processing an image comprises a step 53 of determining correction parameter values for each layer of the atmospheric model according to the optimal values of the atmospheric model.

Generally, the correction parameters of a layer of the atmospheric model correspond to parameters that describe the transfer function of this layer, and which can consequently be used to invert this transfer function and correct the effects of the corresponding layer of the transfer model in the imaged.

In preferred embodiments, the correction parameters considered are for example, for each layer (low layer 30, intermediate layer 31 and top layer 32):
- an intrinsic reflectance $\rho_l$ of the layer considered,
- an intrinsic attenuation $\tau_l$ of the layer considered, which corresponds to the attenuation introduced by the layer considered on the radiation received from an immediately lower layer or, in the case of the low layer 30, received from the scene,
- a proportion of environmental effect $xenv_l$ in the transmission of the layer considered.

The proportion of environmental effect $xenv_l$ corresponds to the contribution of the environment of the point observed in the radiation transmitted to the upper layer, and can be expressed conventionally according to the following expression:

$$xenv_l = \frac{\tau_{do}}{\tau_{oo} + \tau_{do}}$$

expression wherein:
- $\tau_{oo}$ represents the direct transmission of radiation by the layer considered, i.e. the radiation transmission coefficient that effectively comes from the point observed on the ground according to the line of sight considered, by passing through (without interception) the layer considered,
- $\tau_{do}$ represents the indirect transmission of radiation by the layer considered, i.e. the radiation transmission coefficient collected according to the line of sight considered that comes from all of the vicinity of the point observed on the ground, by scattering at the passage of the layer considered.

Nothing excludes however considering other types of correction parameters and the choice of a particular type of correction parameter forms only an alternative implementation of the invention.

The values of such correction parameters can be calculated, for each layer, directly from the atmospheric model by considering the optimal values determined for the different parameters of the atmospheric model. The step 53 of determining values of correction parameters and the step 52 of determining optimal values can therefore be executed simultaneously.

Thus, in the preceding example, the step 53 of determining the correction parameter values must make it possible to determine, for each pixel (and, where applicable, for each basic image, i.e. for each band of wavelengths considered):
- three intrinsic reflectance values $\rho_l$ (one value per layer of the atmospheric model),
- three intrinsic attenuation values $\tau_l$ (one value per layer of the atmospheric model),
- three values of proportion of environmental effect $xenv_l$ (one value per layer of the atmospheric model).

Such as indicated hereinabove, the optimal value of the deck altitude of the atmospheric column of the sky model is substantially the same for all the pixels of the image, in such a way that the values of the correction parameters for the top layer 32 are in principle also substantially the same for all the pixels of the image.

In order to limit the quantity of data to be memorized, it is advantageous to memorize correction tables associated respectively with each parameter of the atmospheric model and with each band of wavelengths considered. For example, this reverts to determining, for each band of wavelengths considered:
- a correction table according to the visibility distance,
- a correction table according to the optical cloud thickness,
- a correction table according to the deck altitude of the atmospheric column.

Such a correction table comprises, for one or several typical values of the parameter of the model considered (visibility distance, optical thickness of a cloud, deck altitude of the atmospheric column), the corresponding values of the correction parameters (intrinsic reflectance, intrinsic attenuation, proportion of environmental effect). The table hereinbelow gives a non-limiting example of such a correction table.

| | Typical values of the model parameter | | | | |
|---|---|---|---|---|---|
| | 3 | 7 | 10 | [...] | 200 |
| Intrinsic reflectance $\rho_l$ | [...] | [...] | [...] | [...] | [...] |
| Intrinsic attenuation $\tau_l$ | [...] | [...] | [...] | [...] | [...] |
| Proportion of environmental effect $xenv_l$ | [...] | [...] | [...] | [...] | [...] |

Such as indicated hereinabove, the optimal value of the deck altitude of the atmospheric column is substantially the same for all of the pixels of the image, in such a way that the corresponding correction table may comprise only a single typical value equal to the optimal value.

Thus, for retrieving the values of the correction parameters to be used for a pixel of the image, for example for the low layer 30 of the atmospheric model, it is sufficient to obtain the optimal value of the visibility distance (for the band of wavelengths of the image considered). This optimal value makes it possible for example to identify, in the correction table associated with the visibility distance (and associated with the band of wavelengths considered), the typical values that are the closest to said determined optimal value as well as the values of the associated correction parameters, and to calculate the final values of the correction parameters via interpolation of said values of correction parameters supplied by the correction table associated with the visibility distance.

D) Conversion of the Image into a Ground Image with Environmental Effects

The method 50 for processing an image also comprises a step 54 of converting the image into a ground image with environmental effects according to the correction parameter values. The step 54 of converting into a ground image with environmental effects aims to correct the effects linked to the presence of aerosols and/or of clouds, except for environmental effects.

More particularly, the step 54 of converting into a ground image with environmental effects successively corrects the effects of each layer of the atmospheric model, by considering said layers successively by decreasing altitudes. In other terms, the effects of the top layer 32 are corrected first, the effects of the intermediate layer 31 are corrected secondly, and the effects of the low layer are corrected last.

Thus, for a given pixel, and by examining after obtaining reflectance values at the top of the atmosphere, designated hereinafter by $\rho_{TOA}$, we successively obtain:
- a reflectance value $\rho_1$ which corresponds to the reflectance at the top of the intermediate layer 31,
- a reflectance value $\rho_2$ which corresponds to the reflectance at the top of the low layer 30,
- a reflectance value $\rho_3$ which corresponds to the ground reflectance with environmental effects.

For each layer of the atmospheric model, the correction is carried out according to the correction parameter values, and aims in particular to suppress the intrinsic reflectance of the layer considered and to offset the intrinsic attenuation of said layer considered, for example according to the following expression:

$$\rho_{K+1} = g_l \times (\rho_K - \rho_l)$$

expression wherein $0 \leq K \leq 2$ and $g_l$ is a gain that offsets the intrinsic attenuation of the layer considered ($g_l = 1/\tau_l$).

Such as indicated hereinabove, the correction parameter values $\rho_l$ and $\tau_l$ depend on the parameter of the model considered (visibility distance, optical thickness of a cloud) and on the optimal value of said parameter of the model considered at the level of the pixel considered (and are according to the band of wavelengths considered). For the deck altitude of the atmospheric column, the optimal value is substantially the same regardless of the pixel considered, and the correction is substantially the same for all of the pixels of the image (and according to the band of wavelengths considered).

E) Conversion into a Ground Image with No Environmental Effects

The method 50 for processing an image also comprises a step 55 of converting the ground image with environmental effects into a ground image with no environmental effects according to the correction parameter values. The step 55 of converting into a ground image with no environmental effects therefore aims to correct the environmental effects.

More particularly, the step 55 of converting into a ground image with no environmental effects successively corrects the effects of each layer of the atmospheric model, by considering said layers successively by decreasing altitudes. In other terms, the effects of the top layer 32 are corrected first, the effects of the intermediate layer 31 are corrected secondly, and the effects of the low layer are corrected last.

Thus, for a given pixel, and by examining after obtaining ground reflectance values with environmental effects, designated hereinafter by $\rho_{3,0}$ (and which corresponds to the reflectance $\rho_3$ calculated hereinabove), we successively obtain:
- a reflectance value $\rho_{3,1}$ which corresponds to the reflectance after correction of the environmental effect of the top layer 32,
- a reflectance value $\rho_{3,2}$ which corresponds to the reflectance after correction of the environmental effect of the top layer 32 and of the intermediate layer 31,
- a reflectance value $\rho_{3,3}$ which corresponds to the ground reflectance with no environmental effects.

For each layer of the atmospheric model, the correction is carried out according to the correction parameter values, and aims to suppress all or a portion of the contributions of the environment, for example according to the following expression:

$$\rho_{3,K+1} = \frac{\rho_{3,K} - xenv_l \times f^{Background}(\rho_{3,K})}{1 - xenv_l}$$

expression wherein $0 \leq K \leq 2$ and $f^{Background}(\rho_{3,K})$ corresponds to a reflectance received in a view cone of which the apex is located on the line of sight of the pixel considered, i.e. on the line that connects the measuring instrument 11 to the portion of the scene represented by the pixel considered. The altitude of the apex of the view cone depends on the layer considered. The altitude of the apex of the view cone is for example chosen as being an average altitude of the scattering effects in the layer considered. This average altitude is for example about 8 kilometers for the top layer 32, 3.5 kilometers for the intermediate layer 31 and 800 meters for the low layer 30. By positioning as such the apex of the view cone, at an altitude that depends on the layer considered, the contributions of the pixels in the vicinity of the pixel considered, in the reflectance received in the view cone, depend on the altitude of the apex of said view cone, and therefore depend on said layer considered.

Figure 6:
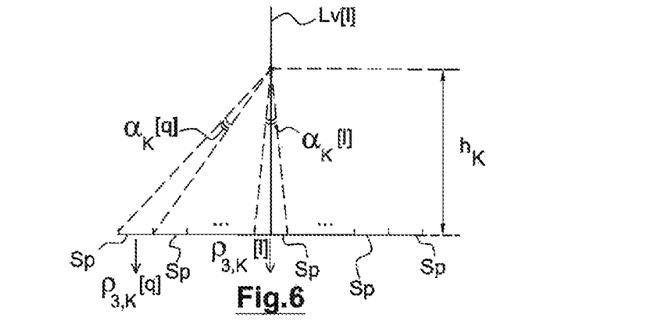
FIG. 6: a diagram showing an example of the calculation of a reflectance received in a view cone.

FIG. 6 shows an example of the calculation of the reflectance received in a view cone. In FIG. 6, it is considered in a non-limiting manner, for the purposes of clarity of the figure, that the line of sight Lv[l] of the pixel considered is vertical. The apex of the view cone is positioned at an altitude $h_K$ which, such as indicated hereinabove, depends on the layer considered. Each pixel represents a predetermined portion of the scene observed, and the different portions represented substantially all have the same dimensions, and therefore substantially the same surface area designated by Sp in FIG. 6. However, the value of the solid angle, formed at the apex of the view cone for observing a portion of the scene from said apex, depends on the considered portion of the scene and on the altitude $h_K$ of the apex of the view cone.

More particularly, the value of the solid angle at the apex of the view cone is maximal for the portion observed under normal incidence, which corresponds to the portion located at the end of the light of sight Lv[l] of the pixel considered in FIG. 6. For the portions of the scene that are not observed under normal incidence, the value of the solid angle at the apex of the view cone decreases with the distance between the portion considered and the portion observed under normal incidence. Furthermore, for the same portion of the scene, the value of the solid angle at the apex of the view cone decreases when the altitude $h_K$ of the apex increases.

In the example shown in FIG. 6, the reflectance of the portion of the scene represented by the pixel considered is designated by $\rho_{3,K}[1]$ and the corresponding value of the solid angle at the apex of the view cone is designated by $\alpha_K[1]$. FIG. 6 also shows the reflectance of a portion of the scene separate from the portion observed under normal incidence, which is designated by $\rho_{3,K}[q]$ and of which the corresponding value of the solid angle at the apex of the view cone is designated by $\alpha_K[q]$, which is such that $\alpha_K[q] < \alpha_K[1]$.

For example, in the example shown in FIG. 6, the reflectance received in the view cone can be calculated according to the following expression:

$$f^{Background}(\rho_{3,K}[l]) = R_K[l] \sum_{n=1}^{Np} \rho_{3,K}[n] \cdot \alpha_K[n]$$

expression wherein:
Np corresponds to the number of pixel considered for the calculation, which is for example equal to the total number of pixels of the ground image with environmental effects,
$R_K[l]$ corresponds to a normalizing factor, which is for example calculated according to the following expression:

$$R_K[l] = \frac{1}{\sum_{n=1}^{Np} \alpha_K[n]}$$

The reflectance received in the view cone is calculated from the reflectance values calculated in the preceding iteration (successively from the reflectances $\rho_{3,0}$, $\rho_{3,1}$ and $\rho_{3,2}$). Said reflectance received in the view cone can be calculated for example by means of rapid convolution filters and pyramid techniques (by successive degradations of the resolution) similar to what was described hereinabove for the spatial filtering.

In the expression hereinabove, $xenv_l \times f^{Background}(\rho_{3,K})$ corresponds to the contribution of the environment of the pixel. Such as indicated hereinabove, the value of the proportion of environmental effect $xenv_l$ depends on the parameter of the model considered (visibility distance, optical thickness of the cloud) and on the optimal value of said parameter of the model considered at the level of the pixel considered (and according to the band of wavelengths considered). For the deck altitude of the atmospheric column of the sky model, the optimal value is substantially the same regardless of the pixel considered, and the correction is substantially the same for all of the pixels (and according to the band of wavelengths considered).

The reflectance values $\rho_{3,3}$ obtained at the end of the corrections described hereinabove form the ground image with no environmental effects.

F) Other Alternatives of the Method for Processing an Image

More generally, it is to be noted that the embodiments considered hereinabove were described by way of non-limiting examples, and that other alternatives can consequently be considered.

Figure 7:
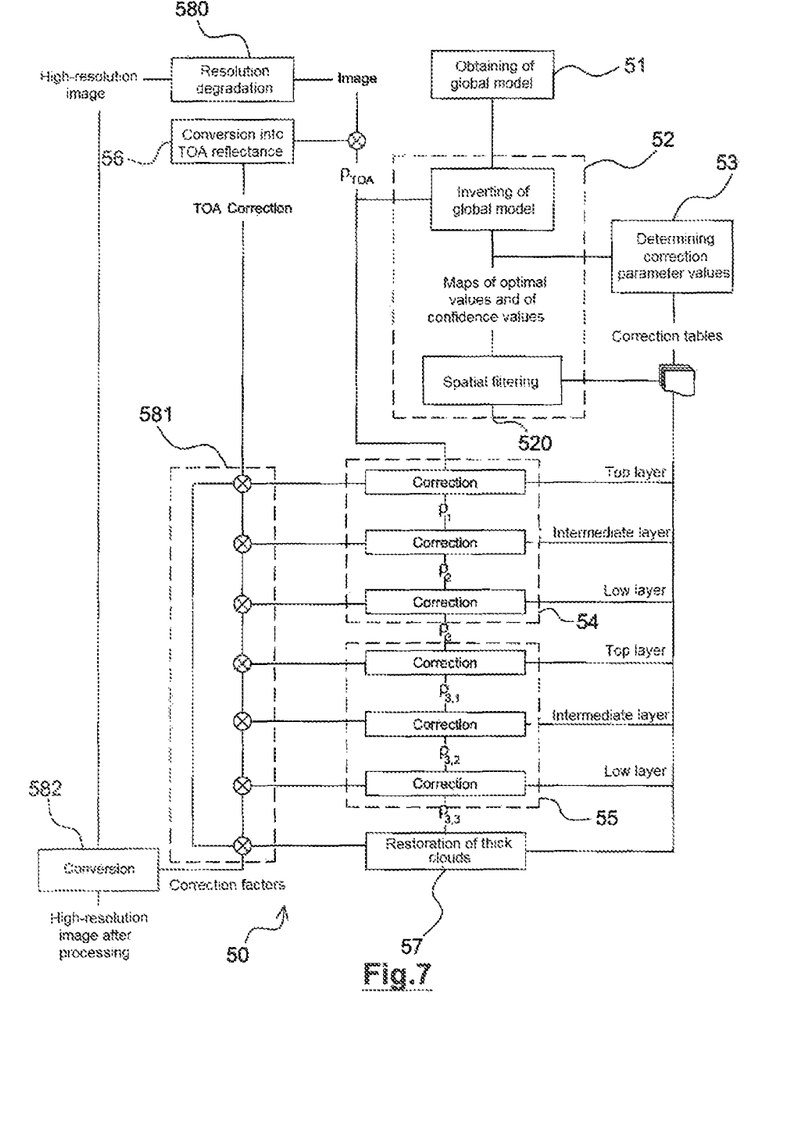
FIG. 7: a diagram showing an alternative embodiment of the method for processing an image of FIG. 3.

FIG. 7 shows a non-limiting example of an alternative embodiment of the method 50 for processing an image of FIG. 3.

In addition to the steps already described in reference to FIG. 3, the method 50 for processing an image comprises for example a step 57 during which the value of each masked pixel is forced, in the ground image with no environmental effects, to a predetermined value.

Indeed, such as indicated hereinabove, in the case of the presence of a thick cloud, it is useless to attempt to restore the ground reflectance because the ground is masked by said thick cloud. The predetermined value corresponds for example to the value of the masked pixel in the image after conversion into top-of-cloud values ($\rho_1$) or into value at the top of the atmosphere ($\rho_{TOA}$).

Furthermore, in the example shown in FIG. 7, the method 50 for processing an image comprises a step 580 of degrading the resolution of a high-resolution image according to a conventional method of image resampling. The term "high resolution" means simply here that the resolution is high in relation to that of the image which is then used to execute the various steps described in reference to FIGS. 2 and 3.

Advantageously, the method 50 for processing an image further comprises a step 581 of determining correction factors to be applied to the image in order to obtain the ground image with no environmental effects, and a step 582 of converting the high-resolution image into a high-resolution ground image with no environmental effects according to said correction factors. For example, the step 582 of converting into a high-resolution ground image with no environmental effects comprises an interpolation of the correction factors in order to bring them to the same resolution as the high-resolution image and an application of the interpolated correction factors on the initial high-resolution image.

The present method for processing can be executed in an automated way without the intervention of an operator at any step whatsoever. The present method for processing can be implemented in a non-limiting way, according to the operational context, within a ground station 20 for the direct receiving of satellite images, within an autonomous software suite dedicated to the processing of satellite or aerial images, or be integrated into a chain of distributed processing for image processing services of the "cloud services" type.

In particular embodiments, the method 50 of processing comprises a prior step (not shown in the figures) of determining if the image comprises a cloud. This step can be implemented according to any method of image qualification known to those skilled in the art. If it is determined that the image does not contain a cloud, then the steps hereinabove are executed by considering an atmospheric model devoid of a cloud model. Otherwise, the steps hereinabove are executed by considering the atmospheric model described hereinabove, comprising at least one aerosol model and a cloud model.

The invention claimed is:

1. Method (50) for processing an optical image acquired by a space vehicle or an aerial vehicle (10), said image representing a radiation in at least one band of wavelengths received from a scene on the surface of the Earth, characterized in that it comprises:
obtaining (51) a ground reflectance model and an atmospheric model, said atmospheric model comprising at least two layers modeling the effects of the atmosphere in different respective altitudes, of which one layer corresponding to an aerosol model and a layer corresponding to a cloud model,
determining (52) optimal parameter values of the ground reflectance model and of atmospheric model parameters making it possible to optimize said ground reflectance model and said atmospheric model with respect to the image, determining (53), for each layer of the atmospheric model, correction parameter values according to the optimal values of the atmospheric model, converting (54) the image into a ground image with environmental effects according to the correction parameter values of each layer of the atmospheric model, converting (55) the ground image with environmental effects into a ground image with no environmental effects according to the correction parameter values of each layer of the atmospheric model.

2. Method (50) according to claim 1, wherein the correction parameters comprise intrinsic reflectances and intrinsic attenuations for each layer of the atmospheric model, and the converting into a ground image with environmental effects comprises a correction of the intrinsic reflectances and of the intrinsic attenuations of the different layers of the atmospheric model.

3. Method (50) according to claim 1, wherein the correction parameters comprise proportions of environmental effects for each layer of the atmospheric model, and the converting into a ground image with no environmental effects comprises a correction of the environmental contributions introduced by the different layers according to proportions of environmental effects.

4. Method (50) according to claim 3, wherein the correcting of an environmental contribution into one pixel for a layer comprises:
    calculating a reflectance received in a view cone of which the apex corresponds to the pixel considered,
    suppressing of said reflectance received in the view cone, weighted by the proportion of environmental effects for the layer considered and the pixel considered.

5. Method (50) according to claim 1, comprising an identification of pixels of the image for which a criterion of opacity of the cloud model is verified, referred to as "masked pixels", and wherein the value of each masked pixel is forced (57), in the ground image with no environmental effects, to a predetermined value.

6. Method (50) according to claim 5, wherein the predetermined value corresponds to the value of the masked pixel in the image after conversion into a value at the cloud top or into a value at the top of the atmosphere.

7. Method (50) according to claim 1, wherein the determining (52) of optimal values of atmospheric model parameters comprises a determining, for each parameter, a map of optimal values of said parameter associated respectively with different pixels of the image, and a spatial filtering (520) of said map of optimal values of said parameter.

8. Method (50) according to claim 7, wherein, for each parameter, the determining of a map of optimal values of said parameter further comprises a determining of a map of confidence values associated with said optimal values, and the spatial filtering (520) of a map of optimal values is carried out according to the associated map of confidence values.

9. Method (50) according to claim 8, wherein the spatial filtering (520) of a map of optimal values comprises a calculation of maps of optimal values at a degraded resolution for different values of resolution degradation, according to the map of optimal values and the associated map of confidence values, and a calculation of a weighted average of the map of optimal values and of the maps of optimal values with a degraded resolution.

10. Method (50) according to claim 1, wherein the image corresponds to a raw image of which the values of the pixels have been converted into top-of-the-atmosphere values.

11. Method (50) according to claim 1, wherein the image corresponds to a high-resolution image of which the resolution has been degraded, comprising a determining (581) of the correction factors to be applied to the image in order to obtain the ground image with no environmental effects, and a converting (582) of the high-resolution image into a high-resolution ground image with no environmental effects according to said correction factors.

12. Method (50) according to claim 1, wherein the atmospheric model further comprises a sky model modeling the effects of the atmosphere in a layer of altitude greater than the layer of the cloud model.

13. Method (50) according to claim 1, comprising a prior step of determining if the image comprises a cloud, with an atmospheric model without a cloud model being used when it is determined that the image does not contain a cloud.

14. A non-transitory computer program product characterized in that it comprises a set of program code instructions that, when they are executed by a processor, configure said processor to implement a method (50) for processing an image according to claim 1.

15. Device for processing an image acquired by a space vehicle or an aerial vehicle (10), characterized in that it comprises means configured to implement a method (50) for processing an image according to claim 1.

* * * * *